United States Patent
Bradbury

[11] Patent Number: 5,693,766
[45] Date of Patent: Dec. 2, 1997

[54] DYE DIFFUSION THERMAL TRANSFER PRINTING

[75] Inventor: Roy Bradbury, St Helens, United Kingdom

[73] Assignee: Zeneca Limited, London, England

[21] Appl. No.: 569,207

[22] PCT Filed: Mar. 27, 1995

[86] PCT No.: PCT/GB95/00674

§ 371 Date: Dec. 18, 1995

§ 102(e) Date: Dec. 18, 1995

[87] PCT Pub. No.: WO95/28287

PCT Pub. Date: Oct. 26, 1995

[30] Foreign Application Priority Data

Apr. 18, 1994 [GB] United Kingdom ............... 9407655

[51] Int. Cl.$^6$ .................. C09B 29/039; C09B 29/09; B41M 5/035; B41M 5/38
[52] U.S. Cl. .................. 534/759; 534/775; 534/794; 534/795; 503/227; 428/195; 428/913; 428/914
[58] Field of Search ................... 534/795, 775, 534/794, 759; 503/227; 428/195, 913, 914

[56] References Cited

U.S. PATENT DOCUMENTS

| | | | |
|---|---|---|---|
| 4,698,651 | 10/1987 | Moore et al. | 503/227 |
| 4,960,873 | 10/1990 | Hansen et al. | 534/775 X |
| 5,200,386 | 4/1993 | Sens et al. | 503/227 |
| 5,518,983 | 5/1996 | Bradbury et al. | 503/227 |

FOREIGN PATENT DOCUMENTS

| | | |
|---|---|---|
| 227 095 | 7/1987 | European Pat. Off. |
| 335 234 | 10/1989 | European Pat. Off. |
| 344 487 | 12/1989 | European Pat. Off. |
| 460 463 | 12/1991 | European Pat. Off. |
| 94/08797 | 4/1994 | WIPO |

*Primary Examiner*—Fiona T. Powers
*Attorney, Agent, or Firm*—Cushman Darby & Cushman IP Group of Pillsbury Madison & Sutro LLP

[57] ABSTRACT

A thermal transfer sheet comprising a substrate having a coating comprising a dye of Formula (1):

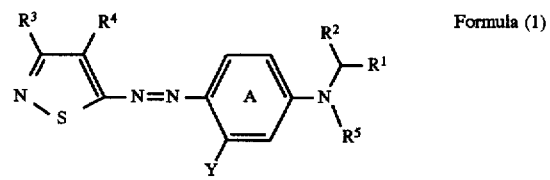

Formula (1)

wherein:

Y is —H, alkyl, alkoxy, —NHCOalkyl, NHCOaryl, —NHSO$_2$alkyl or —NHSO$_2$aryl;

Ring A is unsubstituted apart from the —N=N—, —Y and —N< groups or may be substituted by from 1 to 3 substituent groups;

R$^1$ and R$^2$ each independently is alkyl;

R$^3$ is —H, alkyl, aryl, —SO$_2$alkyl, —Salkyl, —Saryl, halogen, pyridyl or R$^6$O(CH$_2$)$_n$— in which R$^6$ is alkyl, acyl, aryl and n is from 1 to 10;

R$^4$ is —CN, —NO$_2$, —SCN or —COOalkyl; and

R$^5$ is a group of Formula (2):

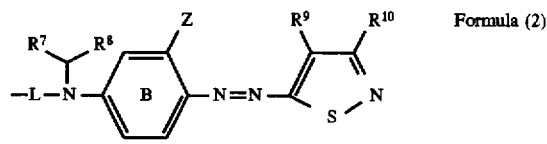

Formula (2)

in which:

Z is —H, alkyl, alkoxy, —NHCOalkyl, —NHCOaryl, —NHSO$_2$alkyl or —NHSO$_2$aryl;

Ring B is unsubstituted apart from the —N=N—, —Z and —N< groups or may be substituted by from 1 to 3 substituent groups;

R$^7$ and R$^8$ each independently is —H or alkyl;

R$^9$ independently is any of the groups defined for R$^4$;

R$^{10}$ independently is any of the groups defined for R$^3$;

L is bridging group; or

R$^5$ is alkyl, provided that when R$^5$ is alkyl R$^3$ is pyridyl or R$^6$O(CH)$_n$—.

4 Claims, No Drawings

DYE DIFFUSION THERMAL TRANSFER PRINTING

This application is a 371 of PCT/GB95/00674, filed Mar. 27, 1995.

This specification describes an invention relating to dye diffusion thermal transfer printing DDTTP or D2T2 printing, especially to a transfer sheet carrying a dye or a dye mixture which has an improved print stability particularly with respect to light fastness, to a transfer printing process in which the dye or the dye mixture is transferred from the transfer sheet to a receiver sheet by the application of heat and to certain novel dyes.

It is known to print woven or knitted textile material by a thermal transfer printing (TTP) process. In such a process a sublimable dye is applied to a paper substrate (usually as an ink also containing a resinous or polymeric binder to bind the dye to the substrate until it is required for printing) in the form of a pattern, to produce a transfer sheet comprising a paper substrate printed with a pattern which it is desired to transfer to the textile. Substantially all the dye is then transferred from the transfer sheet to the textile material, to form an identical pattern on the textile material, by placing the patterned side of the transfer sheet in contact with the textile material and heating the sandwich, under light pressure from a heated plate, to a temperature from 180°–220° C. for a period of 30–120 seconds.

As the surface of the textile substrate is fibrous and uneven it will not be in contact with the printed pattern on the transfer sheet over the whole of the pattern area. It is therefore necessary for the dye to be sublimable and vaporise during passage from the transfer sheet to the textile substrate in order for dye to be transferred from the transfer sheet to the textile substrate over the whole of the pattern area.

As heat is applied evenly over the whole area of the sandwich over a sufficiently long period for equilibrium to be established, conditions are substantially isothermal, the process is non-selective and the dye penetrates deeply into the fibres of the textile material.

In DDTTP, a transfer sheet is formed by applying a heat-transferable dye (usually in the form of a solution or dispersion in a liquid also containing a polymeric or resinous binder to bind the dye to the substrate) to a thin (usually <20 micron) substrate having a smooth plain surface in the form of a continuous even film over the entire printing area of the transfer sheet. Dye is then selectively transferred from the transfer sheet by placing it in contact with a material having a smooth surface with an affinity for the dye, hereinafter called the receiver sheet, and selectively heating discrete areas of the reverse side of the transfer sheet for periods from about 1 to 20 milliseconds (msec) and temperatures up to 300° C., in accordance with a pattern information signal, whereby dye from the selectively heated regions of the transfer sheet diffuses from the transfer sheet to the receiver sheet and forms a pattern thereon in accordance with the pattern in which heat is applied to the transfer sheet. The shape of the pattern is determined by the number and location of the discrete areas which are subjected to heating and the depth of shade in any discrete area is determined by the period of time for which it is heated and the temperature reached.

Heating is generally, though not necessarily, effected by a line of heating elements, over which the receiver and transfer sheets are passed together. Each element is approximately square in overall shape, although the element may optionally be split down the centre, and may be resistively heated by an electrical current passed through it from adjacent circuitry. Each element normally corresponds to an element of image information and can be separately heated to 300° C. to 400° C., in less than 20 msec and preferably less than 10 msec, usually by an electric pulse in response to a pattern information signal. During the heating period the temperature of an element will rise to about 300°–400° C. over about 5–8 msec. With increase in temperature and time more dye will diffuse from the transfer sheet to the receiver sheet and thus the amount of dye transferred onto, and the depth of shade at, any discrete area on the receiver sheet will depend on the period for which an element is heated while it is in contact with the reverse side of the transfer sheet.

As heat is applied through individually energised elements for very short periods of time the process is selective in terms of location and quantity of dye transferred and the transferred dye remains close to the surface of the receiver sheet.

As an alternative heating may be effected using a light source in a light-induced thermal transfer (LITT or L2T2 printing) printer where the light source can be focused, in response to an electronic pattern information signal, on each area of the transfer sheet to be heated. The heat for effecting transfer of the dye from the transfer sheet is generated in the dyesheet which has an absorber for the inducing light. The absorber is selected according to the light source used and converts the light to thermal energy, at a point at which the light is incident, sufficient to transfer the dye at that point to the corresponding position on the receiver sheet. The inducing light usually has a narrow waveband and may be in the visible, infra-red or ultra violet regions although infra-red emitting lasers are particularly suitable.

It is clear that there are significant distinctions between TTP onto synthetic textile materials and DDTTP onto smooth polymeric surfaces and thus dyes which are suitable for the former process are not necessarily suitable for the latter.

In DDTTP it is important that the surfaces of the transfer sheet and receiver sheet are even so that good contact can be achieved between the printed surface of the transfer sheet and the receiving surface of the receiver sheet over the entire printing area because it is believed that the dye is transferred substantially by diffusion in the molten state in condensed phases. Thus, any defect or speck of dust which prevents good contact over any part of the printing area will inhibit transfer and lead to an unprinted portion on the receiver sheet on the area where good contact is prevented, which can be considerably larger than the area of the speck or defect. The surfaces of the substrate of the transfer and receiver sheets are usually a smooth polymeric film, especially of a polyester, which has some affinity for the dye.

Important criteria in the selection of a dye for DDTTP are its thermal properties, fastness properties, such as light fastness, and facility for transfer by diffusion into the substrate in the DDTTP process. For suitable performance the dye or dye mixture should transfer evenly and rapidly, in proportion to the heat applied to the transfer sheet so that the amount transferred to the receiver sheet is proportional to the heat applied. After transfer the dye should preferably not migrate or crystallise and should have excellent fastness to light, heat, rubbing, especially rubbing with a oily or greasy object, e.g. a human finger, such as would be encountered in normal handling of the printed receiver sheet. As the dye should be sufficiently mobile to migrate from the transfer sheet to the receiver sheet at the temperatures employed, 100°–400° C., in the short time-scale, generally <20 msec, it is preferably free from ionic and/or water solubilising groups, and is thus not readily soluble in aqueous or water-miscible media, such as water and ethanol. Many potentially suitable dyes are also not readily soluble in the solvents which are commonly used in, and thus acceptable to, the printing industry; for example, alcohols such as i-propanol, ketones such as methyl ethyl ketone (MEK), methyl i-butyl ketone (MIBK) and cyclohexanone, ethers such as tetrahydrofuran and aromatic hydrocarbons such as toluene. The dye can be applied as a dispersion in a suitable medium or as a solution in a suitable solvent to the substrate from a solution. In order to achieve the potential for a high optical density (OD) on the receiver sheet it is desirable that the dye should be readily soluble or readily dispersable in the ink medium. It is also important that a dye which has been applied to a transfer sheet from a solution should be resistant to crystallisation so that it remains as an amorphous layer on the transfer sheet for a considerable time. Crystallisation not only produces defects which prevent good contact between the transfer receiver sheet but gives rise to uneven prints.

The following combination of properties is highly desirable for a dye which is to be used in DDTTP:

Ideal spectral characteristics (narrow absorption curve) and high extinction coefficient.

Correct thermochemical properties (high thermal stability and efficient transferability with heat).

High optical densities on printing.

Good solubility in solvents acceptable to printing industry: this is desirable to produce solution coated dye-sheets alternatively good dispersibility in acceptable media is desirable to produce dispersion coated dye-sheets.

Stable dyesheets (resistant to dye migration or crystallisation).

Stable printed images on the receiver sheet (resistant to heat, migration, crystallisation, grease, rubbing and light).

DDTTP is used for printing images on suitable substrates.

The achievement of good light fastness in DDTTP is extremely difficult because of the unfavourable environment of the dye, close to the surface of the polyester receiver sheet. Many known dyes for polyester fibre have high light fastness (>6 on the International Scale of 1-8) on polyester fibre when applied by TTP because dye penetration into the fibres is good, but the same dyes exhibit very poor light fastness on a polyester receiver sheet when applied by DDTTP because of poor penetration into the substrate. It is known to improve the light fastness of dyes for use in conventional dyeing techniques by introducing electron-withdrawing groups into the dye molecule but this is generally accompanied by a hyposchromic shift which may be undesirable. The present invention overcomes this problem by providing a convenient means of improving light fastness of dyes in DDTTP without the disadvantage of substantially changing the absorption maximum of the dye.

According to the present invention there is provided a thermal transfer sheet comprising a substrate having a coating comprising a dye of Formula (1):

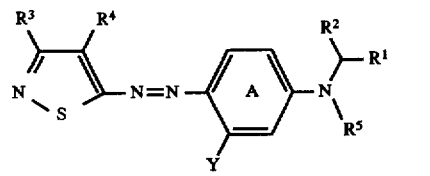

Formula (1)

wherein:

Y is —H, alkyl, alkoxy, —NHCOalkyl, —NHCOaryl, —NHSO$_2$alkyl or NHSO$_2$aryl;

Ring A is unsubstituted apart from the —N=N—, —Y and —N< groups or may be substituted by from 1 to 3 substituent groups;

$R^1$ and $R^2$ each independently is alkyl;

$R^3$ is —H, alkyl, aryl, —SO$_2$alkyl, —Salkyl, —Saryl, halogen, pyridyl or $R^6$O(CH$_2$)$_n$— in which $R^6$ is alkyl, acyl, aryl and n is from 1 to 10;

$R^4$ is —CN, —NO$_2$, —SCN or —COOalkyl; and $R^5$ is a group of Formula (2):

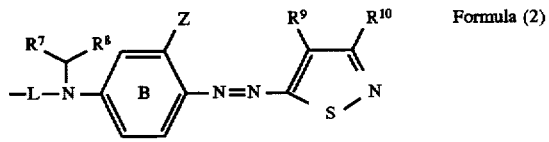

Formula (2)

in which:

Z is —H, alkyl, alkoxy, —NHCOalkyl, —NHCOaryl, —NHSO$_2$alkyl or —NHSO$_2$aryl;

Ring B is unsubstituted apart from the —N=N—, —Z and —N< groups or may be substituted by from 1 to 3 substituent groups;

$R^7$ and $R^8$ each independently is —H or optionally substituted alkyl;

$R^9$ independently is any of the groups defined for $R^4$;

$R^{10}$ independently is any of the groups defined for $R^3$;

L is a bridging group; or $R^5$ is alkyl, provided that when $R^5$ is alkyl $R^3$ is pyridyl or $R^6$O(CH)$_n$—.

Where any one of the groups represented by $R^1$ to $R^{10}$, Z or Y is or contains an alkyl group the alkyl group is preferably $C_{1-10}$-alkyl, more preferably $C_{1-6}$-alkyl and especially $C_{1-4}$-alkyl, such alkyl groups may be straight or branched chain alkyl groups.

Where $R^3$, $R^6$, $R^{10}$, Y or Z is or contains an aryl group the aryl group is preferably phenyl or naphthyl, more preferably phenyl.

Where $R^3$ or $R^{10}$ is halogen it is preferably —F, —Cl or —Br.

Where $R^3$ or $R^{10}$ is pyridyl it may be pyrid-2-yl, pyrid-3-yl or pyrid-4-yl.

Where $R^6$ is acyl it is preferably $C_{1-10}$-alkylCO— or phenylCO— and more preferably $C_{1-4}$-alkylCO— or phenylCO—. n is preferably 1-2.

Where Y or Z is alkoxy it is preferably $C_{1-6}$-alkoxy more preferably $C_{1-4}$-alkoxy.

The bridging group represented by L is preferably alkylene, phenylene or an ester group of Formula (3):

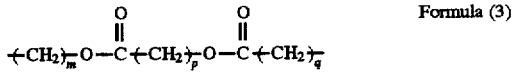

Formula (3)

in which:

m is from 1 to 6 p is from 0 to 4 q is from 1 to 6 m is preferably from 2 to 4. q is preferably from 2 to 4.

Where L is an alkylene group it is preferably $C_{1-12}$-alkylene, more preferably $C_{1-10}$-alkylene and especially $C_{2-10}$-alkylene, such alkylene groups may be branched or straight chain alkylene groups. Where an alkylene group is branched the branching is preferably α- to the nitrogen atom to which L is attached.

The groups represented by $R^1$ to $R^{10}$, Y, Z, L Ring A or Ring B may be optionally substituted and the optional substituents are preferably selected from —CN, —SCN, —$NO_2$, —F, —Cl, —Br, —$SC_{1-4}$-alkyl, —Sphenyl, $C_{1-4}$-alkoxy and —$COOC_{1-4}$-alkyl.

The presence of at least one α-branched alkyl group in compounds of Formula (1) improves the light fastness properties of the compound.

In a preferred sub group of dyes of Formula (1) $R^1$ is $C_{1-4}$-alkyl, especially methyl or ethyl, $R^2$ is $C_{1-6}$-alkyl, $R^3$ is $C_{1-4}$-alkyl, pyridyl or $R^6O(CH_2)_n$— in which $R^6$ is $C_{1-4}$-alkyl, $C_{1-4}$-alkylCO—, phenylCO— or phenyl and n is from 1 to 2, $R^4$ is —CN, $R^5$ is a group of Formula (2) in which L is $C_{1-10}$-alkylene, $R^7$ and $R^8$ each independently is —H or $C_{1-6}$-alkyl, $R^9$ is —CN, $R^{10}$ is $C_{1-4}$-alkyl, pyridyl or $R^6O(CH_2)_n$, in which $R^6$ and n are as defined above, Y and Z each independently is —H, $C_{1-4}$-alkyl, —$NHCOC_{1-4}$-alkyl or —$NHSO_2C_{1-4}$-alkyl, especially —H, —$CH_3$, —$NCOCH_3$ or —$NHSO_2CH_3$ and Rings A and B carry no further substituents.

In a further preferred sub group of dyes of Formula (1) $R^1$ is $C_{1-4}$-alkyl, especially methyl or ethyl, $R^2$ is $C_{1-6}$-alkyl, $R^3$ is pyridyl or $R^6O(CH_2)_n$ in which $R^6$ is $C_{1-4}$-alkyl, $C_{1-4}$-alkylCO—, phenylCO— or phenyl and n is from 1 to 2, $R^4$ is —CN, $R^5$ is $C_{1-6}$-alkyl, Y is —H, $C_{1-4}$-alkyl, —$NHCOC_{1-4}$- alkyl or —$NHSO_2C_{1-4}$-alkyl preferably —H, —$CH_3$, —$NHCOCH_3$ or —$NHSO_2CH_3$ and especially —$CH_3$ and Ring A carries no further substituents.

An especially preferred sub group of dyes of Formula (1) is that in which $R^1$ is methyl or ethyl, $R^2$ is $C_{1-4}$-alkyl, $R^3$ is pyridyl or $C_{1-4}$-alkylOCH$_2$—, $R^4$ is —CN, $R^5$ is $C_{1-4}$-alkyl, and Y is $C_{1-4}$-alkyl.

The dyes of Formula (1) are novel and form a further feature of the present invention.

The dyes of the present invention may be prepared by conventional methods for preparing azo dyes for example by methods disclosed in U.S. Pat. No. 4,960,873.

In addition to the use described above in D2T2 printing the present dyes of Formula (1) are useful as colorants for a variety of applications particularly in inks for use in ink jet printing, as toners for use in reprography and as dyes for dyeing and printing textile materials such as polyester and blends thereof.

The Coating

The coating suitably comprises a binder together with a dye or mixture of dyes of Formula (1). The ratio of binder to dye is preferably at least 0.7:1 and more preferably from 1:1 to 4:1 and especially preferably 1:1 to 2:1 in order to provide good adhesion between the dye and the substrate and inhibit migration of the dye during storage.

The coating may also contain other additives, such as curing agents, preservatives, etc., these and other ingredients being described more fully in EP 133011A, EP 133012A and EP 111004A.

The Binder

The binder may be any resinous or polymeric material suitable for binding the dye to the substrate which has acceptable solubility in the ink medium, i.e. the medium in which the dye and binder are applied to the transfer sheet. It is preferred however, that the dye is soluble in the binder so that it can exist as a solid solution in the binder on the transfer sheet. In this form it is generally more resistant to migration and crystallisation during storage. Examples of binders include cellulose derivatives, such as ethylhydroxyethylcellulose (EHEC), hydroxypropylcellulose (HPC), ethylcellulose, methylcellulose, cellulose acetate and cellulose acetate butyrate; carbohydrate derivatives, such as starch; alginic acid derivatives; alkyd resins; vinyl resins and derivatives, such as polyvinyl alcohol, polyvinyl acetate, polyvinyl butyral, polyvinyl acetoacetal and polyvinyl pyrrolidone; polycarbonates such as AL-71 from Mitsubishi Gas Chemicals and MAKROLON 2040 from Bayer (MAKROLON is a trade mark); polymers and co-polymers derived from acrylates and acrylate derivatives, such as polyacrylic acid, polymethyl methacrylate and styrene-acrylate copolymers, styrene derivatives such as polystyrene, polyester resins, polyamide resins, such as melamines; polyurea and polyurethane resins; organosilicones, such as polysiloxanes, epoxy resins and natural resins, such as gum tragacanth and gum arabic. Mixtures of two or more of the above resins may also be used, mixtures preferably comprise a vinyl resin or derivative and a cellulose derivative, more preferably the mixture comprises polyvinyl butyral and ethylcellulose. It is also preferred to use a binder or mixture of binders which is soluble in one of the above-mentioned commercially acceptable organic solvents.

The dye or mixture of dyes of Formula (1) has good thermal properties giving rise to even prints on the receiver sheet, whose depth of shade is accurately proportional to the quantity of applied heat so that a true grey scale of coloration can be attained.

The dye or mixture of dyes of Formula (1) also has strong absorbance properties and is soluble in a wide range of solvents, especially those solvents which are widely used and accepted in the printing industry, for example, alkanols, such as i-propanol and butanol; aromatic hydrocarbons, such as toluene, ethers, such as tetrahydrofuran and ketones such as MEK, MIBK and cyclohexanone. Alternatively the mixture of dyes maybe dispersed by high shear mixing in suitable media such as water, in the presence of dispersing agents. This produces inks (solvent plus mixture of dyes and binder) which are stable and allow production of solution or dispersion coated dyesheets. The latter are stable, being resistant to dye crystallisation or migration during prolonged storage.

The combination of strong absorbance properties and good solubility in the preferred solvents allows the achievement of good OD of the dye or mixture of dyes of Formula (1) on the receiver sheet. The transfer sheets of the present invention have good stability and produce receiver sheets with good OD and which are fast to both light and heat.

The Substrate

The substrate may be any sheet material preferably having at least one smooth even surface and capable of withstanding the temperatures involved in DDTTP, i.e. up to 400° C. for periods up to 20 msec, yet thin enough to transmit heat applied on one side through to the dyes on the other side to effect transfer of the dye onto a receiver sheet within such short periods. Examples of suitable materials are polymers, especially polyester, polyacrylate, polyamide, cellulosic and polyalkylene films, metallised forms thereof, including co-polymer and laminated films, especially laminates incorporating a smooth even polyester receptor layer on which the dye is deposited. Thin (<20 micron) high quality paper of even thickness and having a smooth coated surface, such as capacitor paper, is also suitable. A laminated substrate preferably comprises a backcoat, on the opposite side of the laminate from the receptor layer, which, in the printing process, holds the molten mass together, such as a thermosetting resin, e.g. a silicone, acrylate or polyurethane resin, to separate the heat source from the polyester and prevent melting of the latter during the DDTTP operation. The thickness of the substrate depends to some extent upon its thermal conductivity but it is preferably less than 20 μm and more preferably less than 10 μm.

The DDTTP Process

According to a further feature of the present invention there is provided a dye diffusion thermal transfer printing process which comprises contacting a transfer sheet comprising a coating comprising a dye or mixture of dyes of Formula (1) with a receiver sheet, so that the coating is in contact with the receiver sheet and selectively applying heat to discrete areas on the reverse side of the transfer sheet whereby the dye on the opposite side of the sheet to the heated areas is transferred to the receiver sheet.

Heating in the selected areas may be effected by contact with heating elements, which can be heated to 200°–450° C., preferably 200°–400° C., over periods of 2 to 10 msec, whereby the dye mixture may be heated to 150°–300° C., depending on the time of exposure, and thereby caused to transfer, substantially by diffusion, from the transfer to the receiver sheet. Good contact between coating and receiver sheet at the point of application is essential to effect transfer. The density of the printed image is related to the time period for which the transfer sheet is heated.

The Receiver Sheet

The receiver sheet conveniently comprises a polyester sheet material, especially a white polyester film, preferably of polyethylene terephthalate (PET). Although some dyes of Formula (1) are known for the coloration of textile materials made from PET, the coloration of textile materials, by dyeing or printing is carried out under such conditions of time and temperature that the dye can penetrate into the PET and become fixed therein. In thermal transfer printing, the time period is so short that penetration of the PET is much less effective and the substrate is preferably provided with a receptive layer, on the side to which the dye is applied, into which the dye mixture more readily diffuses to form a stable image. Such a receptive layer, which may be applied by co-extrusion or solution coating techniques, may comprise a thin layer of a modified polyester or a different polymeric material which is more permeable to the dye than the PET substrate. While the nature of the receptive layer will affect to some extent the depth of shade and quality of the print obtained it has been found that the dyes of Formula (1) give particularly strong and good quality prints (e.g. fastness and storage properties) on any specific transfer or receiver sheet, with the benefit of improved light fastness compared with other dyes of similar structure which have been proposed for thermal transfer printing processes. The design of receiver and transfer sheets is discussed further in EP 133,011 and EP 133012.

The invention is further illustrated by the following examples and comparative examples in which all parts and percentages are by weight.

Ink Preparation

The inks were prepared by dissolving 0.15 g of the dye in a solution containing 5 g of a 6% w/w solution of ethylhydroxyethyl cellulose (EHEC) in tetrahydrofuran and 4.85 g tetrahydrofuran (THF).

Transfer Sheet TS1

This was prepared by applying Ink 1 to a 6 μm polyester film (substrate) using a wire-wound metal Meyer-bar (K-bar No 3) to produce a wet film of ink on the surface of the sheet. The ink was then dried with hot air to give a dry film on the surface of the substrate.

Printed Receiver Sheet RS1

A sample of TS1 was contacted with a receiver sheet, comprising a composite structure based in a white polyester base having a receptive coating layer on the side in contact with the printed surface of TS1. The receiver and transfer sheets were placed together on the drum of a transfer printing machine and passed over a matrix of closely-spaced elements which were selectively heated using a constant power of 0.37 W/pixel for periods from 2 to 10 msec, whereby a quantity of the dye, in proportion to the heating period, at the position on the transfer sheet in contact with an element while it was hot was transferred from the transfer sheet to the receiver sheet. After passage over the array of elements the transfer sheet was separated from the receiver sheet.

Evaluation of Inks Transfer Sheets and Printed Receiver Sheets

The stability of the ink was assessed by visual inspection. An ink was considered to be stable if there was no precipitation over a period of two weeks at ambient.

The light fastness of receiver sheets was assessed by calculating the colour difference of the receiver sheets before and after exposure to xenon light as follows:

Half of the receiver sheet was covered before exposure, in an Atlas Ci35 Weatherometer, to xenon arc light at 0.8 W/m² at a black panel temperature of 45° C. and relative humidity of approximately 50% for 24 hours. The colour difference (ΔE) between the exposed and the unexposed areas on the receiver sheets which correspond to a print time of 10 msec was measured using a Minolta Chromameter utilising the following equation:

$$\Delta E = \sqrt{(L^{*1} - L^{*2})^2 + (a^{*1} - a^{*2})^2 + (b^{*1} - b^{*2})^2}$$

where $L^{*1}$, $a^{*1}$ and $b^{*1}$ are the values before exposure and $L^{*2}$, $a^{*2}$ and $b^{*2}$ are the values after exposure to xenon light. The smaller the value of ΔE the more light fast is the dye on the receiver sheet.

The invention is further illustrated by the following Examples 1 and 2 and comparative Examples A and B.

The dyes used to prepare inks and transfer sheets and for printing on receiver sheets are of Formula (1) in which the substituents are as shown in Table 1.

TABLE 1

| Dye | $R^1$ | $R^2$ | $R^3$ | $R^4$ | $R^5$ | Y |
|---|---|---|---|---|---|---|
| 1 | —CH$_3$ | —C$_2$H$_5$ | pyrid-3-yl | —CN | —C$_2$H$_5$ | —CH$_3$ |
| A | —H | —(CH$_2$)$_2$CH$_3$ | pyrid-3-yl | —CN | —C$_2$H$_5$ | —CH$_3$ |
| 2 | —CH$_3$ | —C$_2$H$_5$ | —CH$_2$OCH$_3$ | —CN | —(CH$_2$)$_3$CH$_3$ | —NHCOCH$_3$ |
| B | —H | —(CH$_2$)$_2$CH$_3$ | —CH$_2$OCH$_3$ | —CN | —(CH$_2$)$_3$CH$_3$ | —NHCOCH$_3$ |

The colour differences (ΔE) were measured for each of Dyes 1 and 2 and A and B as described above and the results are shown in Table 2.

TABLE 2

| Dye | ΔE |
|---|---|
| 1 | 8.35 |
| A | 26.15 |
| 2 | 5.16 |
| B | 7.14 |

The dyes in Examples 1 and 2 which have branched chain N-alkyl substituents, have lower ΔE values than the analogous straight chain N-alkyl substituted dyes in Examples A and B and thus the dyes of the present invention are more light-fast.

I claim:

1. A thermal transfer sheet comprising a substrate having a coating comprising a dye of Formula (1):

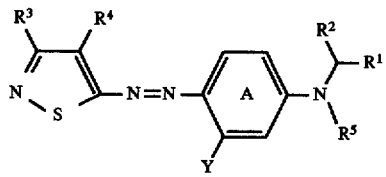

wherein

Y is —H, alkyl, alkoxy, —NHCOalkyl, NHCOaryl, —NHSO$_2$alkyl or —NHSO$_2$aryl;

Ring A is unsubstitued apart for the —N=N—, —Y and —N< groups or may be substituted by from 1 to 3 substituent groups;

R$^1$ and R$^2$ each independently is alkyl;

R$^3$ is —H, alkyl, aryl, —SO$_2$alkyl, —Salkyl, —Saryl, halogen, pyridyl or R$^6$O(CH$_2$)$_n$— in which R$^6$ is alkyl, acyl, aryl and n is from 1 to 10;

R$^4$ is —CN, —NO$_2$, —SCN or —COOalkyl; and

R$^5$ is a group of Formula (2):

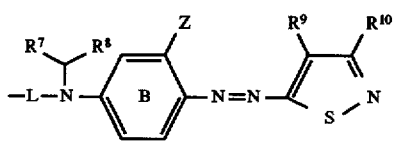

in which

Z is —H, alkyl, alkoxy, —NHCOalkyl, —NHCOaryl, —NHSO$_2$alkyl or —NHSO$_2$aryl;

Ring B is unsubstituted apart from the —N=N—, —Z and —N< groups or may be substituted by from 1 to 3 substituent groups;

R$^7$ and R$^8$ each independently is —H or alkyl;

R$^9$ independently is any of the groups defined for R$^4$;

R$^{10}$ independently is any of the groups defined for R$^3$; and

L is bridging group.

2. A thermal transfer sheet according to claim 1 in which in the dye of Formula (1) R$^1$ is C$_{1-4}$-alkyl, R$^2$ is C$_{1-6}$-alkyl, R$^3$ is pyridyl or R$^6$O(CH$_2$)$_n$ in which R$^6$ is C$_{1-4}$-alkyl, C$_{1-4}$-alkylCO—, phenylCO— or phenyl and n is from 1 to 2, R$^4$ is —CN and Y is —H, C$_{1-4}$-alkyl, —NHCOC$_{1-4}$-alkyl or —NHSO$_2$C$_{1-4}$-alkyl.

3. A thermal transfer printing sheet according to claim 1 in which in the dye of Formula (1) R$^1$ is methyl or ethyl, R$^2$ is C$_{1-4}$-alkyl, R$^3$ is pyridyl or C$_{1-4}$-alkylOCH$_2$—, R$^4$ is —CN, and Y is C$_{1-4}$-alkyl.

4. A dye of Formula (1):

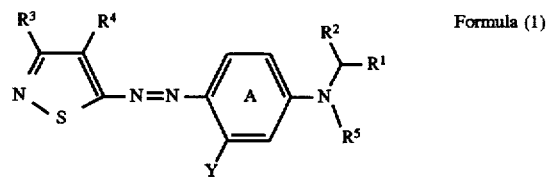

wherein:

Y is —H, alkyl, alkoxy, —NHCOalkyl, —NHCOaryl, —NHSO$_2$alkyl or —NHSO$_2$aryl;

Ring A is unsubstituted apart from the —N=N—, —Y and —N< groups or may be substituted by from 1 to 3 substituent groups;

R$^1$ and R$^2$ each independently is alkyl;

R$^3$ is —H, alkyl, aryl, —SO$_2$alkyl, —Salkyl, —Saryl, halogen, pyridyl or R$^6$O(CH$_2$)$_n$— in which R$^6$ is alkyl, acyl, aryl and n is from 1 to 10;

R$^4$ is —CN, —NO$_2$, —SCN or —COOalkyl; and

R$^5$ is a group of Formula (2):

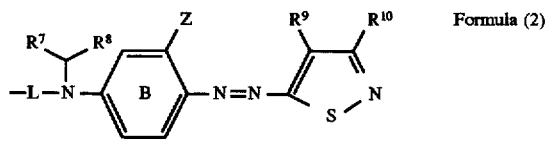

in which:

Z is —H, alkyl, alkoxy, —NHCOalkyl, —NHCOaryl, —NHSO$_2$alkyl or —NHSO$_2$aryl;

Ring B is unsubstituted apart from the —N=N—, —Z and —N< groups or may be substituted by from 1 to 3 substituent groups;

R$^7$ and R$^8$ each independently is —H or alkyl;

R$^9$ independently is any of the groups defined for R$^4$;

R$^{10}$ independently is any of the groups defined for R$^3$ and

L is bridging group.

* * * * *